(12) United States Patent
Wang et al.

(10) Patent No.: US 12,341,151 B2
(45) Date of Patent: Jun. 24, 2025

(54) PLANAR SOLID ELECTROLYTE OXYGEN SEPARATOR

(71) Applicant: National Taipei University of Technology, Taipei (TW)

(72) Inventors: Sea-Fue Wang, Taipei (TW); Jeng-Ting Tsai, Taipei (TW); Hsi-Chuan Lu, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 778 days.

(21) Appl. No.: 17/243,073

(22) Filed: Apr. 28, 2021

(65) Prior Publication Data

US 2022/0320577 A1 Oct. 6, 2022

(30) Foreign Application Priority Data

Apr. 6, 2021 (TW) ................................ 110112365

(51) Int. Cl.
*H01M 10/0562* (2010.01)
*H01M 50/437* (2021.01)
*H01M 50/46* (2021.01)

(52) U.S. Cl.
CPC ..... *H01M 10/0562* (2013.01); *H01M 50/437* (2021.01); *H01M 50/46* (2021.01); *H01M 2300/0071* (2013.01)

(58) Field of Classification Search
CPC ................................ B01D 53/326; C25B 1/02
See application file for complete search history.

(56) References Cited

U.S. PATENT DOCUMENTS 6,117,288 A * 9/2000 Adler .................. C01B 13/0251
204/266
7,427,339 B2 9/2008 Brengel et al.

FOREIGN PATENT DOCUMENTS

TW I453303 B 9/2014

* cited by examiner

*Primary Examiner* — Stephan J Essex
(74) *Attorney, Agent, or Firm* — Birch, Stewart, Kolasch & Birch, LLP

(57) ABSTRACT

A planar solid electrolyte oxygen separator includes a first end plate formed with an oxygen outlet, a second end plate, two solid electrolyte cells disposed between the first and second end plates, and a planar interconnector disposed between the solid electrolyte cells. Each of the solid electrolyte cells includes two electrode layers, a metal-oxide-based electrolyte layer, and a through hole that is aligned with the oxygen outlet. The planar interconnector includes an upper portion having upper main channels and an upper passage, a lower portion having lower channels, and a connecting passage fluidly connected to the upper passage and the lower channels.

19 Claims, 6 Drawing Sheets

PLANAR SOLID ELECTROLYTE OXYGEN SEPARATOR

CROSS-REFERENCE TO RELATED APPLICATION

This application claims priority of Taiwanese Invention Patent Application No. 110112365, filed on Apr. 6, 2021, the entire disclosure of which is incorporated herein by reference.

FIELD

The disclosure relates to a solid electrolyte oxygen separator (SEOS), and more particularly to a planar solid electrolyte oxygen separator containing a metal-oxide-based electrolyte layer.

BACKGROUND

An oxygen transport membrane (OTM) or an ion transport membrane (ITM) made of a ceramic material is capable of transporting oxygen ions at high temperature, and can separate high purity oxygen from air under standard atmospheric pressure without using complicated machines, thereby avoiding operational noise pollution.

Taiwanese Invention Patent Publication No. TW I453303B, which is the counterpart application of U.S. Pat. No. 8,702,914B2, discloses a conventional oxygen generator having a body with a honeycomb structure. The honeycomb structure is made of an oxygen ion conductive material, e.g., a bismuth oxide ($Bi_2O_3$) material doubly stabilized with $Y_2O_3$ and $ZrO_2$, and may increase the time air stays in the body, which results in improved oxygen production rate. Nevertheless, the conventional oxygen generator needs to be constructed to include multiple walls (e.g., channel walls), multiple through-holes, multiple oxygen outlets for oxygen collection, and multiple glass members for sealing, and is thus complicated in structure. Therefore, difficulties may be encountered in assembling the aforementioned components due to the complicated structure. In addition, the dip-coating method used in the conventional oxygen generator may result in a non-uniform thickness of the conductive layers formed on the channel walls.

SUMMARY

Therefore, an object of the disclosure is to provide a planar solid electrolyte oxygen separator that can alleviate at least one of the drawbacks of the prior art.

According to the disclosure, there is provided a planar solid electrolyte oxygen separator which includes a first end plate that is formed with an oxygen outlet, a second end plate that is separated from the first end plate, at least two solid electrolyte cells that are disposed between the first end plate and the second end plate, and at least one planar interconnector. Each of the solid electrolyte cells includes two electrode layers, a metal-oxide-based electrolyte layer that is disposed between the electrode layers, and a through hole that extends through the electrode layers and the metal-oxide-based electrolyte layer and that is aligned with the oxygen outlet.

Each of the at least one planar interconnector is disposed between the two of at least two solid electrolyte cells and includes an upper portion, a lower portion, and a connecting passage.

The upper portion has an upper surface that faces toward the first end plate and has a front inlet region, a rear outlet region, an upper main region, a plurality of upper main channels, and a raised structure. The front inlet region is for introducing an oxygen-containing fluid into the planar interconnector. The front inlet region is inwardly recessed from the upper surface. The rear outlet region is for allowing an oxygen-depleted fluid to exit from the planar interconnector. The rear outlet region is opposite to the front inlet region and is inwardly recessed from the upper surface. The upper main region is disposed between the front inlet region and the rear outlet region, and is aligned with and is located below the electrode layer of one of the solid electrolyte cells. The plurality of upper main channels are inwardly recessed from the upper surface and formed in the upper main region of the upper portion. Each of the upper main channels is fluidly connected to the front inlet region and the rear outlet region. The raised structure is located on the upper main region and is formed with an upper passage therein. The upper passage is fluidly separated from the upper main channels and is fluidly connected to the through hole of the one of the solid electrolyte cells.

The lower portion is connected to the upper portion and has a lower surface that is opposite to the upper surface and that faces toward the second end plate. The lower surface includes a lower main region, a surrounding region surrounding the lower main region, and a plurality of lower channels. The lower main region is aligned with and located above the electrode layer of another one of the solid electrolyte cells. The plurality of lower channels are inwardly recessed from the lower surface and are formed in the lower main region of the lower portion.

The connecting passage is fluidly connected to the upper passage of the raised structure of the upper portion and the lower channels of the lower portion.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
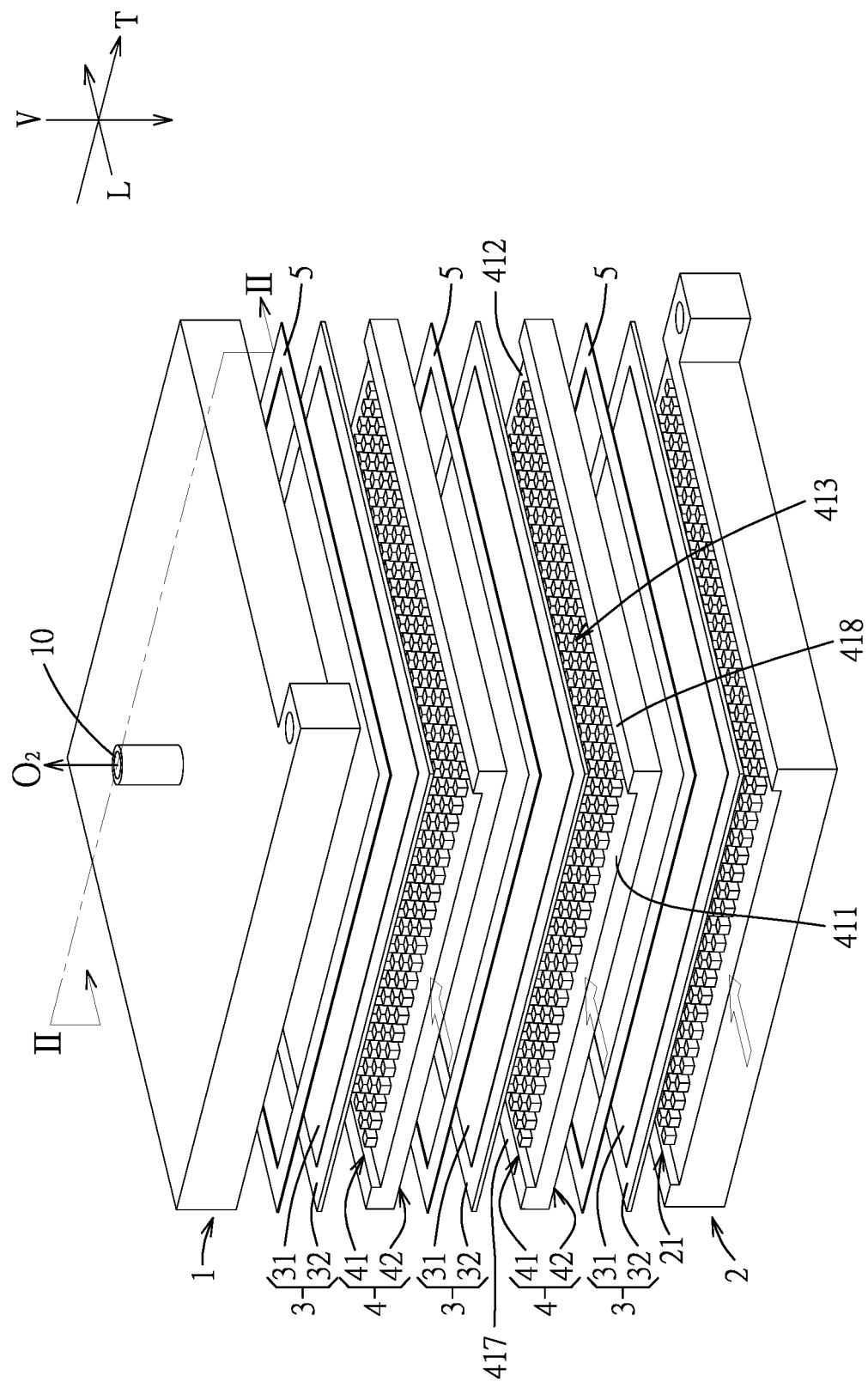
FIG. 1 is an exploded perspective view of a first embodiment of a planar solid electrolyte oxygen separator according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

In addition, in the description of the present disclosure, the terms "upper", "lower", "front", "rear", "right", "left", "top", "bottom", "longitudinal", "transverse" are meant to indicate relative position between the elements of the disclosure, and are not meant to indicate the actual position of each of the elements in actual implementations.

Figure 2:
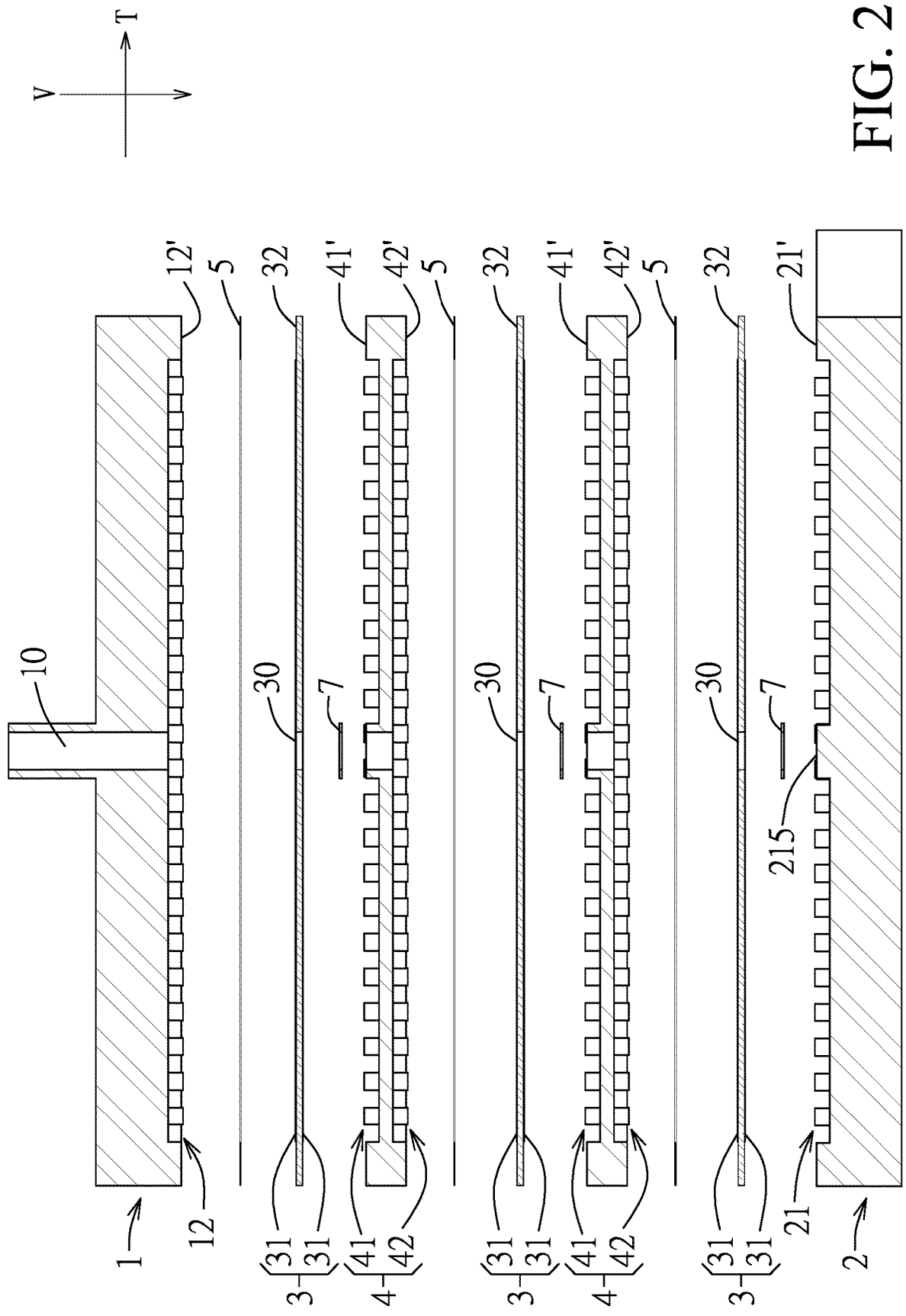
FIG. 2 is a schematic sectional view of the first embodiment of the planar solid electrolyte oxygen separator taken along line II-II in FIG. 1.

Referring to FIGS. 1 and 2, a first embodiment of a planar solid electrolyte oxygen separator according to the present disclosure includes a first end plate 1, a second end plate 2, at least two solid electrolyte cells 3, and at least one planar interconnector 4. The first end plate 1 is formed with an oxygen outlet 10 which extends through the first end plate 1. The second end plate 2 is separated from the first end plate 1 in a direction (V). The at least two solid electrolyte cells 3 are disposed between the first end plate 1 and the second end plate 2. Each of the at least one planar interconnector 4 is disposed between two of the at least two solid electrolyte cells 3. In some embodiments, for preventing oxygen leakage, the planar solid electrolyte oxygen separator further includes at least one anode-sealing component 5 and at least one sealing ring 7. In this embodiment, the planar solid electrolyte oxygen separator has three of the solid electrolyte cells 3 (respectively referred to, in a direction from the first end plate 1 toward the second end plate 2, as first, second and third solid electrolyte cells 3), two of the planar interconnectors 4 (respectively referred to as first and second planar interconnectors), three of the anode-sealing components 5, and three of the sealing rings 7. Specifically, the first planar interconnector 4 is disposed between the first and second solid electrolyte cells 3, and the second planar interconnector 4 is disposed between the second and third solid electrolyte cells 3.

Figure 3:
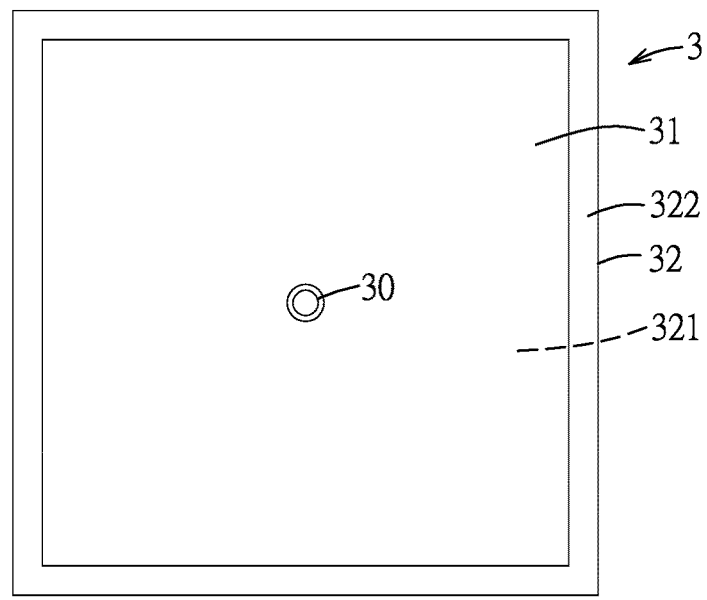
FIG. 3 is a schematic top view of a solid electrolyte cell included in the first embodiment of the planar solid electrolyte oxygen separator.
Figure 4:
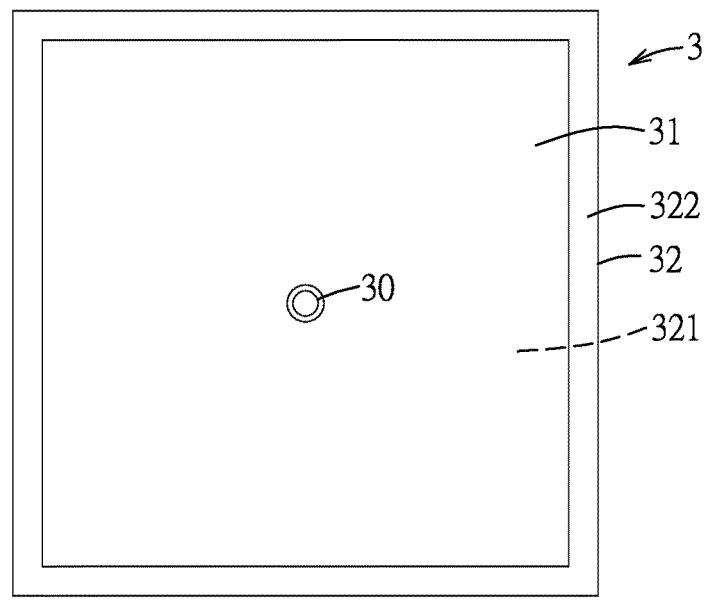
FIG. 4 is a schematic bottom view of the solid electrolyte cell included in the first embodiment of the planar solid electrolyte oxygen separator.
Figure 5:
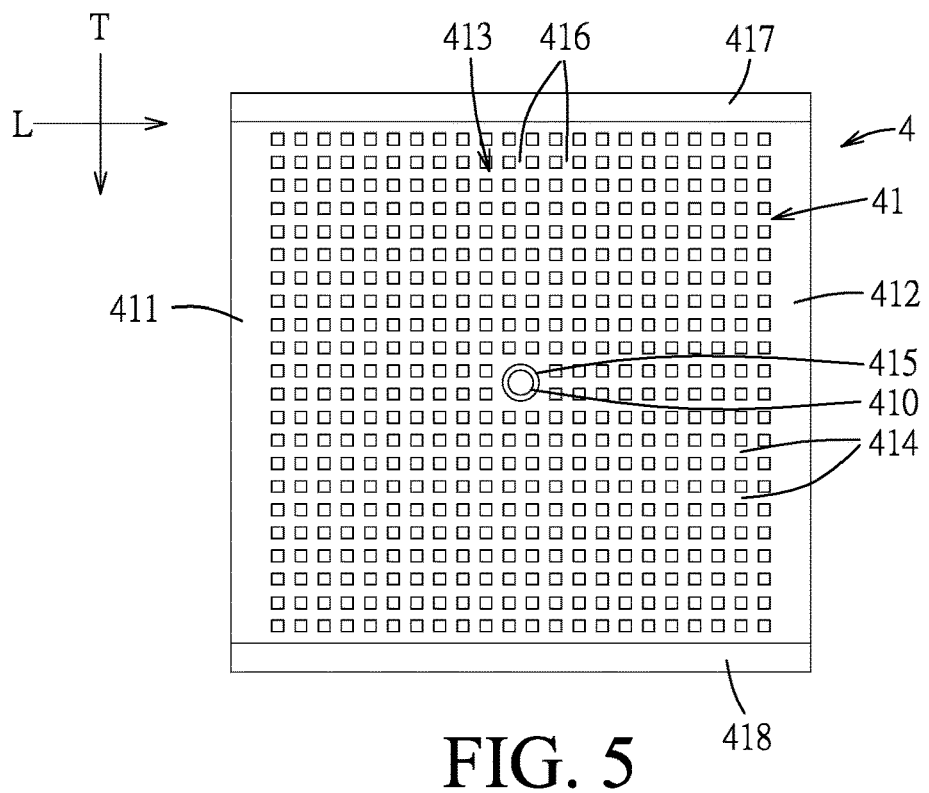
FIG. 5 is a schematic top view of a planar interconnector included in the first embodiment of the planar solid electrolyte oxygen separator.
Figure 6:
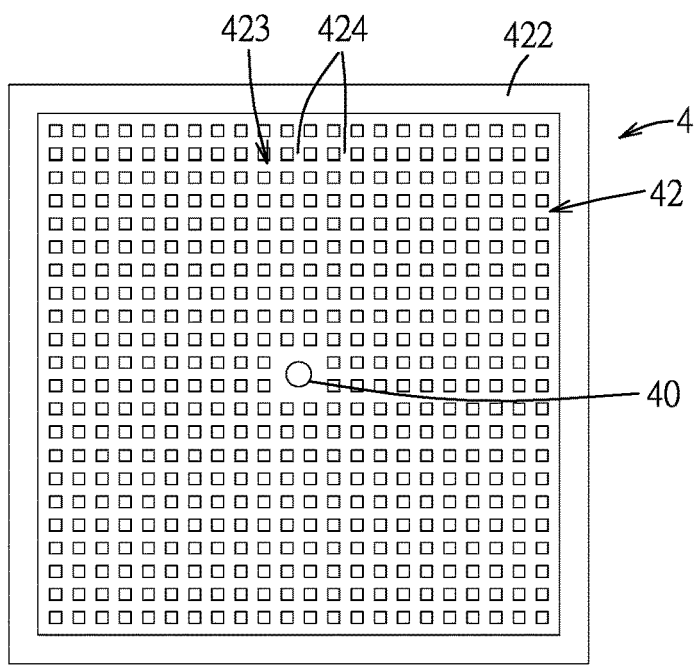
FIG. 6 is a schematic bottom view of the planar interconnector included in the first embodiment of the planar solid electrolyte oxygen separator.

Referring further to FIGS. 2, 3 and 4, each of the solid electrolyte cells 3 according to the present disclosure includes two electrode layers 31, a metal-oxide-based electrolyte layer 32, and a through hole 30. The metal-oxide-based electrolyte layer 32 is disposed between the two electrode layers 31. In certain embodiments, the metal-oxide-based electrolyte layer 32 includes a central portion 321 and a surrounding portion 322 which surrounds the central portion 321. In certain embodiments, for each of the solid electrolyte cells 3, the central portion 321 of the metal-oxide-based electrolyte layer 32 is sandwiched between the two electrode layers 31. In other words, the surrounding portion 322 is not covered by the two electrode layers 31. The through hole 30 extends through the electrode layers 31 and the metal-oxide-based electrolyte layer 32, and is aligned with the oxygen outlet 10 so that the through hole 30 is fluidly connected to the oxygen outlet 10. In certain embodiments, the through hole 30 is formed in the central portion 321 of the metal-oxide-based electrolyte layer 32. In certain embodiments, an axis of the through hole 30 coincides with the geometric center of the electrode layers 31.

In some embodiments, the metal-oxide-based electrolyte layer 32 is made from at least one of a bismuth-oxide-based material, a zirconium-oxide-based material, a cerium-oxide-based material, and a lanthanum-oxide-based material.

In this embodiment, the metal-oxide-based electrolyte layer 32 is made from a bismuth-oxide-based material. A method for making the bismuth-oxide-based electrolyte layer 32 includes the following steps: a) preparing $(Bi_{1.50}Y_{0.50})_{0.98}Zr_{0.04}O_{3.02}$ (BYO) from $Bi_2O_3$, $Y_2O_3$, and $ZrO_2$ through solid-phase synthesis; b) mixing BYO with toluene, ethanol, a binder, and a dispersant to obtain an electrolyte mixture having a solid content ranging from 50 vol % to 60 vol %; c) ball milling and de-aerating the electrolyte mixture to obtain an electrolyte slurry; d) tape casting the electrolyte slurry to obtain an electrolyte tape having a thickness ranging from 20 μm to 60 μm; e) laminating plurality of the electrolyte tapes at a temperature ranging from 60° C. to 80° C. to obtain a planar green body; f) cutting the planar green body into a square shape using a cutter; g) debinding the square-shaped green body at 550° C. for 4 hours; h) after step g), sintering the square-shaped green body at 1000° C. for 2 hours to obtain bismuth-oxide-based electrolyte layers each having a dimension of 10 cm×10 cm and a thickness ranging from 0.3 mm to 0.8 mm; and i) forming a through hole 30 in a central portion of each of the bismuth-oxide-based electrolyte layers 32.

In certain embodiments, the electrode layer 31 is one of a metal-based electrode layer and a ceramic electrode layer.

In certain embodiments, the metal-based electrode layer includes silicide and a metal selected from silver, platinum, or gold.

A method for making a solid electrolyte cell 3 that includes silver-based electrode layers 31 and the bismuth-oxide-based electrolyte layer 32 in accordance with some embodiments of the present disclosure is disclosed as follows. First, $Bi_{1.71}Nb_{0.25}Ba_{0.04}O_{3.23}$ (BBNO) is prepared from $Bi_2O_3$, $Nb_2O_3$, and $BaCO_3$ through solid-phase synthesis, followed by screen-printing BBNO on both sides of the central portion of the bismuth-oxide-based electrolyte layer 32 and liquid-phase sintering BBNO at 950° C. for 2 hours. The central portion of the bismuth-oxide-based electrolyte layer 32 is defined to have an area of about 9 cm×9 cm. It should be noted that BBNO does not cover the through hole of the bismuth-oxide-based electrolyte layer 32. Next, a silver paste (purchased from EPI Material Technology Inc.) is applied on the BBNO. The silver paste contains 5 wt % silane and 3 wt % oven glass. Thereafter, the bismuth-oxide-based electrolyte layer 32 coated with BBNO and the silver paste is heated at 760° C. for 2 hours so that a solid electrolyte cell 3, having silver-based electrode layers 31 and the bismuth-oxide-based electrolyte layer 32, is obtained. Each of the silver-based electrode layers 31 has a thickness of about 10 μm.

In certain embodiments, the ceramic electrode layer includes doped metal oxide and a composite oxide with a perovskite structure.

A method for making a solid electrolyte cell 3 that includes ceramic electrode layers and the bismuth-oxide-based electrolyte layer 32 in accordance with some embodiments of the present disclosure is disclosed as follows. First, BYO and $La_{0.8}Sr_{0.2}MnO_3$ (LSM) are mixed in a weight ratio of 1:1 to obtain a slurry, followed by screen-printing the slurry on both sides of the central portion of the bismuth-oxide-based electrolyte layer 32. The central portion of the bismuth-oxide-based electrolyte layer 32 is defined to have an area of about 9 cm×9 cm. It should be noted that BBNO does not cover the through hole of the bismuth-oxide-based electrolyte layer 32. Thereafter, the bismuth-oxide-based electrolyte layer 32 with the slurry is debound at 400° C. for 2 hours, followed by sintering at 900° C. for 2 hours to obtain a solid electrolyte cell 3 having the ceramic electrode layers and the bismuth-oxide-based electrolyte layer 32. Each of the ceramic electrode layers has a thickness of about 20 μm.

By using the tape casting technique to form the bismuth-oxide-based electrolyte layer 32 and the screen printing technique to form the electrode layers 31, the thickness of the bismuth-oxide-based electrolyte layer 32 and the electrode layers 31 can be uniformly controlled.

Referring further to FIGS. 1, 2, 5 and 6, in the first embodiment of the present disclosure, each of the planar interconnectors 4 includes an upper portion 41, a lower portion 42 connected to the upper portion 41 and being opposite to the upper portion 41 in the direction (V), and a connecting passage 40. The upper portion 41 has an upper surface 41' which faces toward the first end plate 1. The lower portion 42 has a lower surface 42' which is opposite to the upper surface 41' in the direction (V) and which faces toward the second end plate 2. In this embodiment, each of the planar interconnectors 4 is made from JIS SUS316 stainless steel.

The upper portion 41 of the planar interconnector 4 includes a front inlet region 411, a rear outlet region 412, an upper main region 413, a plurality of upper main channels 414, and a raised structure 415.

The front inlet region 411 is for introducing an oxygen-containing fluid (e.g., air) into the planar interconnector 4 and is inwardly recessed from the upper surface 41'. The rear outlet region 412 is opposite to the front inlet region 411 in a longitudinal direction (L) transverse to (e.g., perpendicular to) the direction (V), is for allowing an oxygen-depleted fluid to exit from the inside of the planar interconnector 4, and is inwardly recessed from the upper surface 41'. The upper main region 413 is disposed between the front inlet region 411 and the rear outlet region 412, and is aligned with and located below the electrode layer 31 of one of the solid electrolyte cells 3 disposed thereabove. The front inlet region 411 and the rear outlet region 412 are aligned with the surrounding portion 322 of the metal-oxide-based electrolyte layer 32 of the one of the solid electrolyte cells 3 disposed thereabove. The plurality of upper main channels 414 are inwardly recessed from the upper surface 41' and are formed in the upper main region 413 of the upper portion 41. Each of the upper main channels 414 is fluidly connected to the front inlet region. 411 and the rear outlet region 412, and serves as fluid passages between the front inlet region 411 and the rear outlet region 412. The raised structure 415 is located on the upper main region 413 and is formed with an upper passage 410 therein. The upper passage 410 is fluidly separated from the upper main channels 414 and is fluidly connected to the through hole 30. In certain embodiments, the raised structure 415 is toroidal-shaped.

According to the first embodiment of the present disclosure, the upper portion 41 of each of the planar interconnectors 4 further includes upper auxiliary channels 416 that intersect the upper main channels 414 so as to form a channel matrix.

In certain embodiments, the upper portion 41 of each of the planar interconnectors 4 further includes a left marginal region 417 and a right marginal region 418 disposed opposite to the left marginal region 417 in a direction (T) which is transverse to the direction (V) and the longitudinal direction (L). The left marginal region 417 and the right marginal region 418 are aligned with the surrounding portion 322 of the metal-oxide-based electrolyte layer 32 of the corresponding one of the solid electrolyte cells 3. The left marginal region 417 and the right marginal region 418 are protruded relative to the front inlet region 411 and the rear outlet region 412. The upper main region 413 is surrounded by the front inlet region 411, the rear outlet region 412, the left marginal region 417, and the right marginal region 418.

The lower portion 42 of each of the planar interconnectors 4 has a lower main region 423 that is aligned with and is located above the electrode layer 32 of the solid electrolyte cell 3 disposed thereunder, a surrounding region 422 surrounding the lower main region 423, and a plurality of lower channels 424. The plurality of lower channels 424 are inwardly recessed from the lower surface 42' and are formed in the lower main region 423.

The connecting passage 40 is fluidly connected to the upper passage 410 of the raised structure 415 of the upper portion 41 and the lower channels 424 of the lower portion 42. In certain embodiments, the lower channels 424 intersect with each other so as to form a channel matrix.

Figure 7:
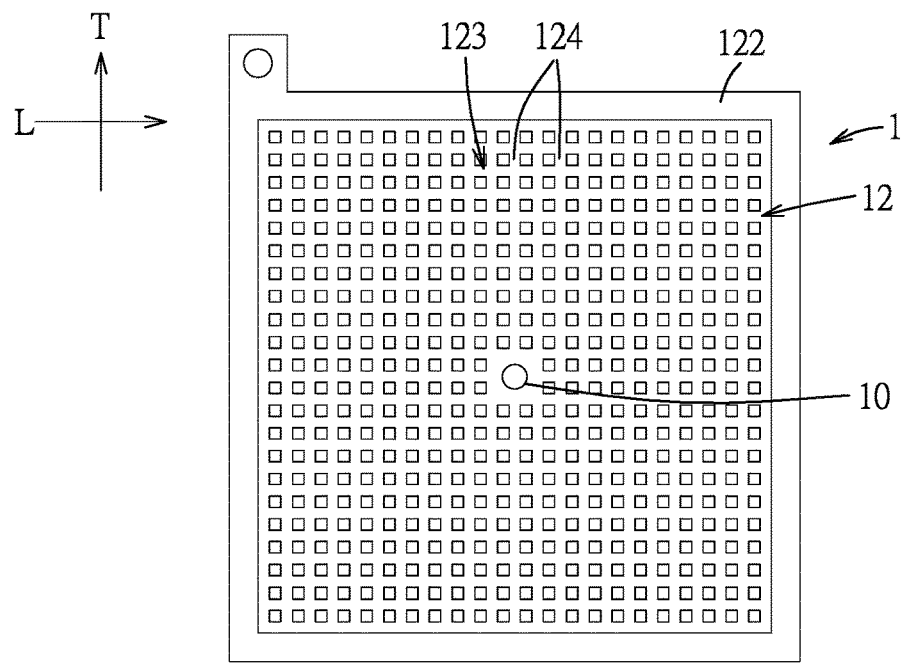
FIG. 7 is a schematic bottom view of a first end plate included in the first embodiment of the planar solid electrolyte oxygen separator.

Referring to FIGS. 2 and 7, according to the first embodiment of the present disclosure, the first end plate 1 includes a lower plate portion 12 that faces toward the second end plate 2 and that has a lower plate surface 12'. The lower plate portion 12 includes a lower main zone 123, a surrounding zone 122 that surrounds the lower main zone 123, and a plurality of lower channels 124. The lower main zone 123 is aligned with and is located above the electrode layer 31 of the first solid electrolyte cell 3. The oxygen outlet 10 is fluidly connected to the lower main zone 123. The plurality of lower channels 124 are formed in the lower main zone 123, are indented relative to the lower plate surface 12', and are fluidly connected to the oxygen outlet 10.

According to the first embodiment of the present disclosure, a first one of the anode-sealing components 3 is disposed between the surrounding zone 122 of the lower plate surface 12' of the first end plate 1 and the surrounding portion 322 of the metal-oxide-based electrolyte layer 32 of the first solid electrolyte cell 3 to form a fluid-tight seal therebetween. A second one of the anode-sealing components 5 is disposed between the surrounding region 422 of the lower portion 42 of the first planar interconnector 4 and the surrounding portion 322 of the metal-oxide-based electrolyte layer 32 of the second solid electrolyte cell 3 to form a fluid-tight seal therebetween. A third one of the anode-sealing components 5 is disposed between the surrounding region 422 of the lower portion 42 of the second planar interconnector 4 and the surrounding portion 322 of the metal-oxide-based electrolyte layer 32 of the third solid electrolyte cell 3 to form a fluid-tight seal therebetween. In manufacturing the planar solid electrolyte oxygen separator, the anode-sealing components 5 are formed by softening and compressing a material for the anode-sealing components 5 between the first end plate 1 and the first solid electrolyte cell 3, the first planar interconnector 4 and the second solid electrolyte cell 3, and the second planar interconnector 4 and the third solid electrolyte cell 3. In some embodiments, the anode-sealing components 5 may be made from, but not limited to, a glass-ceramic material, e.g., the glass-ceramic material in the $ZnO-Al_2O_3-nSiO_2$ (ZAS) system. The anode-sealing components 5 may reduce thermal expansion stress between the first end plate 1 and the first solid electrolyte cell 3, and between the planar interconnectors 4 and the second and third solid electrolyte cells 3.

Figure 8:
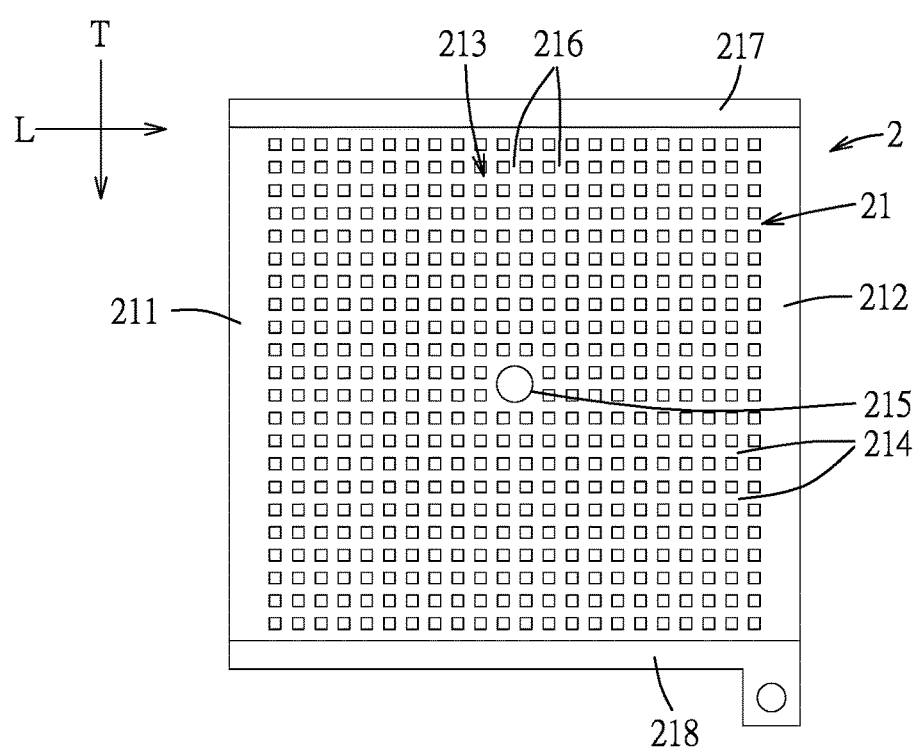
FIG. 8 is a schematic top view of a second end plate included in the first embodiment of the planar solid electrolyte oxygen separator.

Referring to FIGS. 2 and 8, according to the first embodiment of the present disclosure, the second end plate 2 includes an upper plate portion 21 that faces the first end plate 1 and that has an upper plate surface 21'. The upper plate portion 21 includes a front inlet zone 211 for introducing the oxygen-containing fluid into the second end plate 2, a rear outlet zone 212 for allowing the oxygen-depleted fluid to exit from the second end plate 2, an upper main zone 213, a plurality of upper main channels 214, and a protrusion 215. The front inlet zone 211 is inwardly recessed from the upper plate surface 21'. The rear outlet zone 212 is opposite to the front inlet zone 211 in the longitudinal direction (L), and is inwardly recessed from the upper plate surface 21'. The upper main zone 213 is disposed between the front inlet zone 211 and the rear outlet zone 212, and is aligned with and located below the electrode layer 31 of the third solid electrolyte cells 3. The plurality of upper main channels 214 are inwardly recessed from (i.e., indented relative to) the upper plate surface 21' and formed in the upper main zone 213 of the upper plate portion 21. Each of the upper main channels 214 are fluidly connected to the front inlet zone 211 and the rear outlet zone 212. The protrusion 215 is disposed on the upper main zone 213 and fluidly separates the through hole 30 of the third solid electrolyte cell 3 and the upper main channels 214 of the second end plate 2.

In certain embodiments, the upper main zone 213 of the upper plate portion 21 of the second end plate 2 further includes upper auxiliary channels 216 that intersect the upper main channels 214 of the upper plate portion 21 of the second end plate 2 so as to form a channel matrix.

In certain embodiments, the upper plate surface 21' of the second end plate 2 further includes a left marginal zone 217 and a right marginal zone 218 opposite to the left marginal zone 217 in the direction (T). The left marginal zone 217 and the right marginal zone 218 are located below the surrounding portion 322 of the metal-oxide-based electrolyte layer of the third solid electrolyte cell 3. The left marginal zone 217 and the right marginal zone 218 are protruded relative to the front inlet zone 211 and the rear outlet zone 212. The upper main zone 213 is surrounded by the front inlet zone 211, the rear outlet zone 212, the left marginal zone 217, and the right marginal zone 218.

Referring back to FIG. 2, according to the first embodiment of the present disclosure, one of the sealing rings 7 is disposed between the protrusion 215 of the second end plate 2 and the third solid electrolyte cell 3 to form a fluid-tight seal therebetween. The other two of the sealing rings 7 are disposed between the raised structure 415 of the planar interconnectors 4 and the solid electrolyte cells 3 to prevent the oxygen flowing through the upper passages 410 and the through holes 30 from leaking. In manufacturing the planar solid electrolyte oxygen separator, the sealing rings 7 are formed by softening and compressing a material for the sealing ring 7 between the first solid electrolyte cell and the first planar interconnector 4, the second solid electrolyte cell 3 and the second planar interconnector 4, and the third solid electrolyte cell 3 and the second end plate 2. Each of the sealing rings 7 may be made of a material that is the same as that of the anode-sealing components 5.

Figure 9:
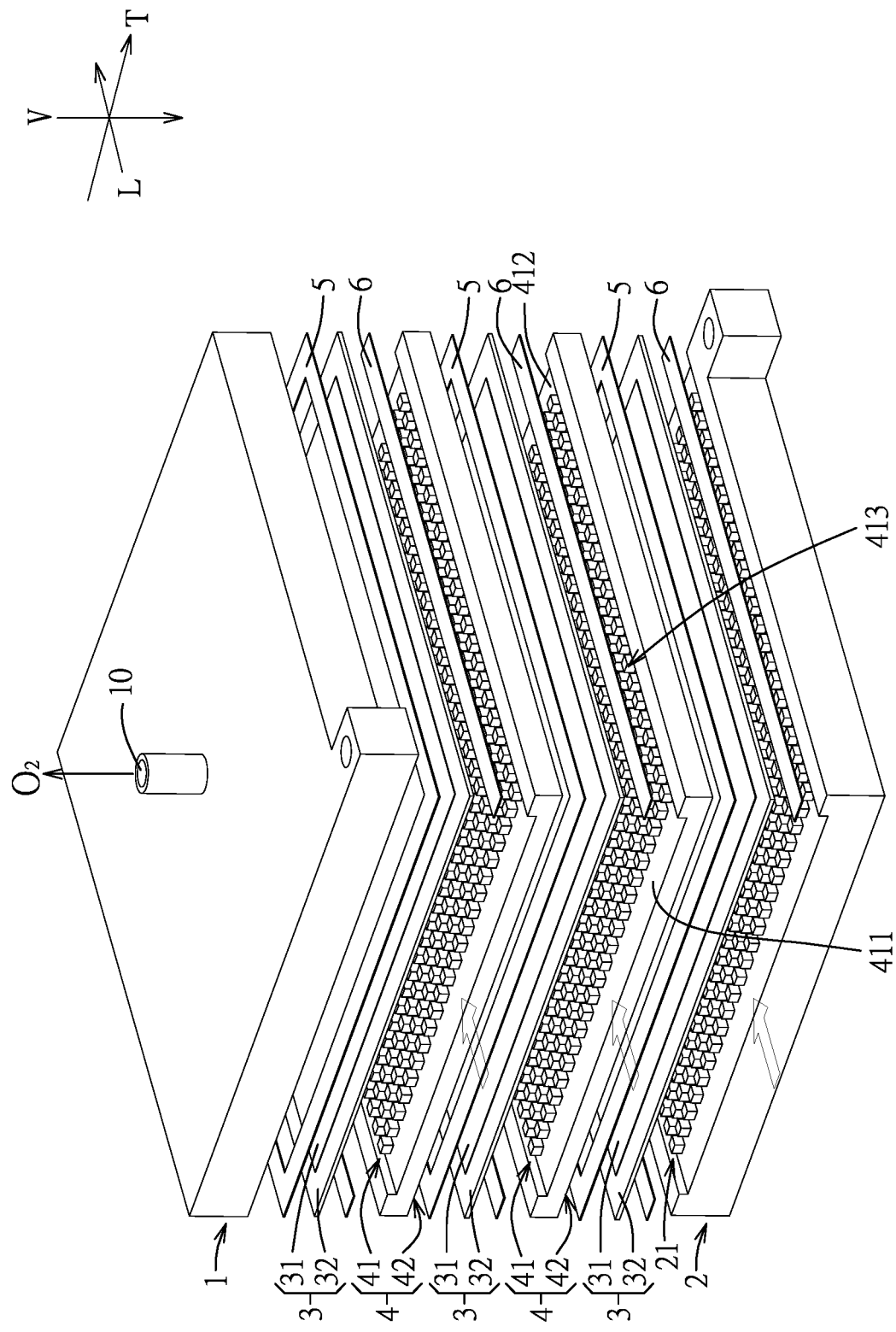
FIG. 9 is an exploded perspective view of a second embodiment of a planar solid electrolyte oxygen separator according to the disclosure.

Referring to FIG. 9, a second embodiment of the planar solid electrolyte oxygen separator according to the present disclosure is provided. The second embodiment is similar to the first embodiment, except that the second embodiment further includes at least one cathode-sealing component 6. In this embodiment, the planar solid electrolyte oxygen separator includes three of the cathode-sealing components 6 (i.e., first, second and third cathode-sealing components 6) each of which includes two cathode-sealing strips. The first cathode-sealing component 6 is disposed between the first planar interconnector 4 and the surrounding portion 322 of the metal-oxide-based electrolyte layer 32 of the first solid electrolyte cell 3 so as to form a fluid-tight seal therebetween. To be more specific, one of the cathode-sealing strips of the first cathode-sealing component 6 is disposed between the left marginal region 417 of the first planar interconnector 4 and the surrounding portion 322 of the metal-oxide-based electrolyte layer 32 of the first solid electrolyte cell 3, and the other one of the cathode-sealing strips of the first cathode-sealing component 6 is disposed between the right marginal region 418 of the first planar interconnector 4 and the surrounding portion 322 of the metal-oxide-based electrolyte layer 32 of the first solid electrolyte cell 3.

The second cathode-sealing component 6 is disposed between the second planar interconnector 4 and the surrounding portion 322 of the metal-oxide-based electrolyte layer 32 of the second solid electrolyte cell 3 so as to form a fluid-tight seal therebetween. The positional relationship between the two cathode-sealing strips of the second cathode-sealing component 6 and the surrounding portion 322 of the metal-oxide-based electrolyte layer 32 of the second solid electrolyte cell 3 is similar to the relationship between the first cathode-sealing component 6 and the first solid electrolyte cell 3.

The third cathode-sealing component 6 is disposed between the second end plate 2 and the surrounding portion 322 of the metal-oxide-based electrolyte layer 32 of the third solid electrolyte cell 3 to form a fluid-tight seal therebetween. To be more specific, the cathode-sealing strips of the third cathode-sealing component 6 are disposed between the left marginal zone 217/right marginal zone 218 of the upper plate portion 21 and the surrounding portion 322 of the metal-oxide-based electrolyte layer 32 of the third solid electrolyte cell 3. In manufacturing the planar solid electrolyte oxygen separator, the cathode-sealing components 6 are formed by softening and compressing a material for the cathode-sealing components 6 between the first solid electrolyte cell 3 and the first planar interconnector 4, the second solid electrolyte cell 3 and the second planar interconnector 4, and the third solid electrolyte cell 3 and the second end plate 2. The cathode-sealing component 6 is made of a material that is the same as that of the anode-sealing component 5.

For the first planar interconnector 4, as the oxygen-containing fluid passes through the front inlet region 411 of the upper portion 41, oxygen molecules contained in the oxygen-containing fluid are in contact with the electrode layer 31 that face the upper portion 41, and are reduced to oxygen ions. The oxygen ions migrate to the other electrode layer 31 that is opposite to the upper portion 41 through the metal-oxide-based electrolyte layer 32, where the oxygen ions are oxidized to oxygen molecules. Thereafter, the oxygen molecules flow through the lower channels 124 of the lower plate portion 12 of the first end plate 1, and exit from the planar solid electrolyte oxygen separator through the oxygen outlet 10.

For the second planar interconnector 4, as the oxygen-containing fluid passes through the front inlet region 411 of the upper portion 41, oxygen molecules contained in the oxygen-containing fluid are in contact with the electrode layer 31 that faces the upper portion 41, and are reduced to oxygen ions. The oxygen ions migrate to the other electrode layer 31 opposite to the upper portion 41 through the metal-oxide-based electrolyte layer 32, where the oxygen ions are oxidized to oxygen molecules. Thereafter, the oxygen molecules flow through the lower channels 424 of the lower portion 42 of the first planar interconnector 2, the connecting passage 40 of the first planar interconnector 4, the upper passage 410 of the first planar interconnector 4, and exit from the planar solid electrolyte oxygen separator through the oxygen outlet 10.

For the second end plate 2, as oxygen-containing fluid passes through the front inlet zone 211, oxygen molecules are in contact with the electrode layer 31 that faces the upper plate portion 21, and are reduced to oxygen ions. The oxygen ions migrate to the other electrode layer 31 opposite to the upper plate portion 21 through the metal-oxide-based electrolyte layer 32, where the oxygen ions are oxidized to oxygen molecules. Thereafter, the oxygen molecules flow through the lower channels 424 of the lower portion 42 of the second planar interconnector 4, the connecting passages 40 of the first and second planar interconnectors 4, the upper passages 410 of the first and second planar interconnectors 4, and exit from the planar solid electrolyte oxygen separator through the oxygen outlet 10.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A planar solid electrolyte oxygen separator, comprising:
    a first end plate that is formed with an oxygen outlet;
    a second end plate that is separated from said first end plate;
    at least two solid electrolyte cells that are disposed between said first end plate and said second end plate, each of said solid electrolyte cells including:
        two electrode layers,
        a metal-oxide-based electrolyte layer that is disposed between said electrode layers, and
        a through hole that extends through said electrode layers and said metal-oxide- based electrolyte layer and that is aligned with said oxygen outlet; and
    at least one planar interconnector, each of said at least one planar interconnector being disposed between said two of at least two solid electrolyte cells and including:
        an upper portion having an upper surface that faces toward said first end plate, said upper portion having
            a front inlet region for introducing an oxygen-containing fluid into said planar interconnector, said front inlet region being inwardly recessed from said upper surface,
            a rear outlet region for allowing an oxygen-depleted fluid to exit from said planar interconnector, said rear outlet region being opposite to said front inlet region and inwardly recessed from said upper surface,
            an upper main region disposed between said front inlet region and said rear outlet region, and aligned with and located below said electrode layer of one of said solid electrolyte cells,
            a plurality of upper main channels inwardly recessed from said upper surface and formed in said upper main region of said upper portion, each of said upper main channels being fluidly connected to said front inlet region and said rear outlet region, and
            a raised structure located on said upper main region and formed with an upper passage therein, said upper passage being fluidly separated from said upper main channels and fluidly connected to said through hole of said one of said solid electrolyte cells,
        a lower portion connected to said upper portion and having a lower surface that is opposite to said upper surface and that faces toward said second end plate, said lower portion having
            a lower main region aligned with and located above said electrode layer of another one of said solid electrolyte cells,
            a surrounding region surrounding said lower main region,
            a plurality of lower channels inwardly recessed from said lower surface and formed in said lower main region of said lower portion, and
        a connecting passage fluidly connected to said upper passage of said raised structure of said upper portion and said lower channels of said lower portion;
    wherein, for each of said solid electrolyte cells, said metal-oxide-based electrolyte layer includes a central portion and a surrounding portion that surrounds said central portion, said central portion of said metal-oxide-based electrolyte layer being sandwiched between two electrode layers; and
    wherein said upper portion of said planar interconnector further includes
        a left marginal region that is aligned with said surrounding portion of said metal-oxide-based electrolyte layer of said one of said solid electrolyte cells, and
        a right marginal region that is disposed opposite to said left marginal region, and that is aligned with said surrounding portion of said metal-oxide-based electrolyte layer of said one of said solid electrolyte cells;
    wherein said left marginal region and said right marginal region are protruded relative to said front inlet region and said rear outlet region; and
    wherein said planar interconnector is made of stainless steel and is integrally formed in one-piece.

2. The planar solid electrolyte oxygen separator as claimed in claim 1, wherein said first end plate includes a lower plate portion having a lower plate surface that faces toward said second end plate, the lower plate portion including:
    a lower main zone which is aligned with and located above said electrode layer of said one of said solid electrolyte cells;

a surrounding zone which surrounds said lower main zone; and a plurality of lower channels which are formed in said lower main zone, indented relative to said lower plate surface, and fluidly connected to said oxygen outlet.

3. The planar solid electrolyte oxygen separator as claimed in claim 1, further comprising an anode-sealing component disposed between said surrounding region of said lower portion of said planar interconnector and said surrounding portion of said metal-oxide-based electrolyte layer of said another one of said solid electrolyte cells.

4. The planar solid electrolyte oxygen separator as claimed in claim 2, further comprising an anode-sealing component disposed between said surrounding zone of said lower plate portion of said first end plate and said surrounding portion of said metal-oxide-based electrolyte layer of said one of said solid electrolyte cells.

5. The planar solid electrolyte oxygen separator as claimed in claim 4, wherein said anode-sealing component is made from a glass-ceramic material.

6. The planar solid electrolyte oxygen separator as claimed in claim 1, wherein said second end plate includes an upper plate portion having an upper plate surface that faces said first end plate, said upper plate portion includes:
 a front inlet zone for introducing an oxygen-containing fluid into said second end plate, said front inlet zone being inwardly recessed from said upper plate surface;
 a rear outlet zone for allowing an oxygen-depleted fluid to exit from said second end plate, said rear outlet zone being opposite to said front inlet zone and inwardly recessed from said upper plate surface;
 an upper main zone disposed between said front inlet zone and said rear outlet zone, and aligned with and located below said electrode layer of said another one of said solid electrolyte cells;
 a plurality of upper main channels inwardly recessed from said upper plate surface and formed in said upper main zone of said upper plate portion, each of said upper main channels being fluidly connected to said front inlet zone and said rear outlet zone; and
 a protrusion disposed on said upper main zone, and fluidly separating said through hole of said another one of said solid electrolyte cells from said upper main channels of said second end plate.

7. The planar solid electrolyte oxygen separator as claimed in claim 6, wherein said upper plate portion of said second end plate further includes:
 a left marginal zone that is located below said surrounding portion of said metal-oxide- based electrolyte layer of said another one of said solid electrolyte cells; and
 a right marginal zone that is disposed opposite to said left marginal zone, and that is located below said surrounding portion of said metal-oxide-based electrolyte layer of said another one of said solid electrolyte cells, and
 wherein said upper main zone is surrounded by said front inlet zone, said rear outlet zone, said left marginal zone, and said right marginal zone.

8. The planar solid electrolyte oxygen separator as claimed in claim 1, further comprising a cathode-sealing component disposed between said planar interconnector and said surrounding portion of said metal-oxide-based electrolyte layer of said one of said solid electrolyte cells.

9. The planar solid electrolyte oxygen separator as claimed in claim 1, further comprising a cathode-sealing component disposed between said second end plate and said surrounding portion of said metal-oxide-based electrolyte layer of said another one of said solid electrolyte cells.

10. The planar solid electrolyte oxygen separator as claimed in claim 1, wherein said second end plate includes an upper plate portion having an upper plate surface that faces said first end plate, said upper plate portion includes:
 a front inlet zone for introducing an oxygen-containing fluid into said second end plate, said front inlet zone being inwardly recessed from said upper plate surface;
 a rear outlet zone for allowing an oxygen-depleted fluid to exit from said second end plate, said rear outlet zone being opposite to said front inlet zone and inwardly recessed from said upper plate surface;
 an upper main zone disposed between said front inlet zone and said rear outlet zone, and aligned with and located below said electrode layer of said another one of said solid electrolyte cells;
 a plurality of upper main channels inwardly recessed from said upper plate surface and formed in said upper main zone of said upper plate portion, each of said upper main channels being fluidly connected to said front inlet zone and said rear outlet zone; and
 a protrusion disposed on said upper main zone, and fluidly separating said through hole of said another one of said solid electrolyte cells from said upper main channels of said second end plate.

11. The planar solid electrolyte oxygen separator as claimed in claim 1, wherein said upper portion of said planar interconnector further includes upper auxiliary channels intersecting said upper main channels of said upper portion so as to form a channel matrix.

12. The planar solid electrolyte oxygen separator as claimed in claim 1, wherein said lower channels intersect with each other to form a channel matrix.

13. The planar solid electrolyte oxygen separator as claimed in claim 1, wherein said electrode layer of each of said solid electrolyte cells is one of a metal-based electrode layer and a ceramic electrode layer.

14. The planar solid electrolyte oxygen separator as claimed in claim 13, wherein said metal-based electrode layer includes silicide and a metal selected from silver, platinum, or gold.

15. The planar solid electrolyte oxygen separator as claimed in claim 13, wherein said ceramic electrode layer includes doped metal oxide and a composite oxide with a perovskite structure.

16. The planar solid electrolyte oxygen separator as claimed in claim 1, wherein said metal-oxide-based electrolyte layer is made from at least one of a bismuth-oxide-based material, a zirconium-oxide-based material, a cerium-oxide-based material, and a lanthanum-oxide-based material.

17. The planar solid electrolyte oxygen separator as claimed in claim 1, wherein said raised structure is toroidal-shaped.

18. The planar solid electrolyte oxygen separator as claimed in claim 3, further comprising a cathode-sealing component disposed between said planar interconnector and said surrounding portion of said metal-oxide-based electrolyte layer of said one of said solid electrolyte cells.

19. The planar solid electrolyte oxygen separator as claimed in claim 4, further comprising a cathode-sealing component disposed between said second end plate and said surrounding portion of said metal-oxide-based electrolyte layer of said another one of said solid electrolyte cells.

* * * * *